United States Patent
Dupeux et al.

(10) Patent No.: US 8,766,501 B2
(45) Date of Patent: Jul. 1, 2014

(54) ROTATING ELECTRICAL MACHINE, IN PARTICULAR FOR A MOTOR VEHICLE STARTER

(75) Inventors: Benoit Dupeux, Oyeu (FR); Nicolas Labbe, Lyons (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 1149 days.

(21) Appl. No.: 12/672,609

(22) PCT Filed: Jul. 21, 2008

(86) PCT No.: PCT/FR2008/051375
§ 371 (c)(1),
(2), (4) Date: May 17, 2011

(87) PCT Pub. No.: WO2009/024697
PCT Pub. Date: Feb. 26, 2009

(65) Prior Publication Data
US 2011/0210634 A1 Sep. 1, 2011

(30) Foreign Application Priority Data
Aug. 22, 2007 (FR) .................................... 07 57122

(51) Int. Cl.
*H02K 21/26* (2006.01)
*H02K 21/38* (2006.01)
*H02K 23/04* (2006.01)
*H02K 1/17* (2006.01)

(52) U.S. Cl.
CPC ................ *H02K 21/26* (2013.01); *H02K 21/38* (2013.01); *H02K 23/04* (2013.01); *H02K 1/17* (2013.01)
USPC ................................ 310/154.28; 310/154.43

(58) Field of Classification Search
CPC ....... H02K 23/04; H02K 21/26; H02K 21/38; H02K 1/17
USPC ........................................ 310/154.28, 154.43
IPC ................................. H02K 21/26, 21/38, 23/04
See application file for complete search history.

(56) References Cited

U.S. PATENT DOCUMENTS 5,109,172 A * 4/1992 Pace .......................... 310/154.43
5,349,258 A * 9/1994 Leupold et al. ........... 310/154.43
(Continued)

FOREIGN PATENT DOCUMENTS

DE 3730615 A1 3/1989
EP 0215441 A2 3/1987
(Continued)

OTHER PUBLICATIONS

ECEE, "Chapter 13, Magnetic Field in Materials", U. of Colorado, 2000.*

*Primary Examiner* — John K Kim
(74) *Attorney, Agent, or Firm* — Berenato & White, LLC (57) ABSTRACT

A direct-current rotating electrical machine, in particular for a motor vehicle starter. The machine includes a stator comprising a magnetized structure with permanent magnetization, extending along a circumference of the stator, a rotor, and a group of brushes arranged to allow the electrical supply of the rotor by switching the electrical current in sections of the rotor. The magnetized structure of the machine includes a plurality of main magnets and a plurality of auxiliary magnets, each arranged between two main magnets. The auxiliary magnets have a smaller angular extent and/or radial thickness than the main magnets. The magnetization vector in at least one of the main and auxiliary magnets varies continuously or in steps, at least locally taking a direction other than radial and orthoradial directions.

6 Claims, 11 Drawing Sheets

(56) References Cited

U.S. PATENT DOCUMENTS

| | | | |
|---|---|---|---|
| 5,677,587 A * | 10/1997 | Sakashita et al. | 310/154.28 |
| 5,723,929 A * | 3/1998 | Niimi | 310/154.43 |
| 5,949,169 A * | 9/1999 | Niimi | 310/154.43 |
| 6,628,030 B2 * | 9/2003 | Harada et al. | 310/154.29 |
| 7,560,841 B2 * | 7/2009 | Honkura et al. | 310/156.43 |
| 2004/0251760 A1 * | 12/2004 | Tanaka et al. | 310/154.06 |
| 2010/0127590 A1 * | 5/2010 | Metral et al. | 310/154.15 |
| 2011/0210634 A1 * | 9/2011 | Dupeux et al. | 310/154.28 |

FOREIGN PATENT DOCUMENTS

| | | |
|---|---|---|
| FR | 2910192 A1 | 6/2008 |
| JP | 2002095230 | 3/2002 |
| JP | 2004023915 | 1/2004 |
| WO | WO 2008/074954 A1 | 6/2008 |

* cited by examiner

Fig. 15
State of the art

Fig. 16
State of the art

ROTATING ELECTRICAL MACHINE, IN PARTICULAR FOR A MOTOR VEHICLE STARTER

FIELD OF THE INVENTION

The present invention especially concerns a rotating electrical machine, in particular for a motor vehicle starter.

BACKGROUND OF THE INVENTION

Patent EP-B1-985 334 describes a starter comprising a stator provided with a plurality of magnetic poles arranged on an internal circumferential surface of a yoke. Each magnetic pole is formed by a permanent magnet made of magnetised ferrite such that the North and South poles appear radially. Auxiliary magnets may be provided between said magnets. These auxiliary magnets are made of ferrite and magnetised so that the North and South poles appear circumferentially. A space is provided between each auxiliary magnet and the yoke. An arrangement of this type reduces magnetic leakage.

It has been found that a strong magnetic armature reaction in a direct current electric machine with brushes, especially in a starter having a magnetomotive force (firm) of great intensity at very low voltage and at an output of over 1 kW, may lead to a reduction in the performance of the machine. In certain cases, an angular displacement of the brushes and/or a compensating winding or an auxiliary switching winding are utilised to reduce the effects accompanying the magnetic armature reaction. The angular displacement of the brushes is optimal only for a predetermined electric current. What is more, said winding is usually bulky.

Furthermore, the article entitled 'The application of Halbach cylinders to brushless AC servo motors', K. Atallah and D. Howe, IEEE Transactions On Magnetics, Vol. 34, No 4, July 1998, discloses a machine of the 'Brushless' type in which the induction variation in relation to the electrical angle in the air gap is sinusoidal. The article 'New concept of permanent magnet excitation for electrical machines. Analytical and numerical computation', M. Marinescu and N. Marinescu, IEEE Transactions On Magnetics, Vol. 28, No. 2, March 1992, deals with magnetisation in a machine of the 'Slotless' type, the magnetic excitation being either on the rotor or on the stator of the machine.

One of the objectives of the invention is to reduce the effects of the magnetic armature reaction.

SUMMARY OF THE INVENTION

The object of the invention, according to one of its aspects, is a direct current rotating electrical machine, especially for a motor vehicle starter, the machine comprising:
- a stator, or inductor, comprising a magnetised structure with permanent magnetisation, extending along a circumference of the stator,
- a rotor, or armature,
- a group of brushes arranged so as to allow the electrical supply of the rotor by switching the electrical current in sections of the rotor, the machine being characterised by the fact that the magnetised structure of the stator comprises at least one sector with magnetisation taking a direction other than radial and orthoradial directions of the stator.

The invention as defined above makes it possible, in particular, to produce the magnetised structure with two or more angular transitions between two consecutive magnetic poles of the machine. The direction of magnetisation can thus vary relatively progressively as one moves along the circumference of the magnetised structure.

The applicant has found, unexpectedly, that a magnetised structure of this type may make it possible to increase the torque and the specific output of the machine, and to reduce, or even essentially cancel out, the displacement of the magnetic neutral line when the armature current increases, and thus essentially cancel out the effects of the magnetic armature reaction. The magnetic neutral line is defined as the point at which induction is cancelled out between two consecutives poles of the inductor.

With the aid of the invention, it is thus possible to avoid the use of a compensating winding or an auxiliary switching winding, or an angular displacement of the brushes.

The invention may also make it possible to improve switching and to limit both wear on the brushes and the vibroacoustic radiation of the machine.

The angular transitions further reinforce the mechanical stability of the permanent magnets of the magnetised structure.

Preferably, the sector with a magnetisation in a direction other than radial and orthoradial directions extends over an electrical angle greater than 10°, especially 20°, even 30° or 40°.

The electrical angle corresponds to an angle effectively measured inside the machine, also referred to as the mechanical angle, multiplied by the number of pairs of poles of the machine, which amounts to considering any machine whatsoever as a juxtaposition within a single assembly of several elementary machines with a single pair of poles.

Advantageously, the direction of magnetisation, in the sector with magnetisation in a direction other than radial and orthoradial directions, forms an angle with the orthoradial direction of the stator, of, for example, between 5° and 85°, especially between 10° and 80°, even between 20° and 70° or between 30° and 60°.

In one embodiment of the invention, magnetisation inside the magnetised structure has a direction which is not parallel to itself when one moves along one turn of the stator.

If desired, the direction of magnetisation inside the magnetised structure, in relation to a radial direction, varies without angular jump greater than 90°, especially without an angular jump greater than or equal to 45°, when one moves along the circumference of the stator.

The magnetised structure of the stator may be arranged against a yoke and have a magnetisation selected such that the magnetic field generated by the magnetised structure outside thereof, and measured in the absence of the yoke, is weaker than the field generated inside the magnetised structure, the magnetic energy outside the magnetised structure being in particular less than 30% or 20% of the magnetic energy inside the structure, the magnetic energy outside the structure, measured in the absence of the yoke, being in particular essentially zero.

Advantageously, between two consecutive magnetic poles of the magnetised structure, the angle between the direction of magnetisation of the structure and a radial direction of the stator varies monotonically, i.e. this angle varies by increasing or decreasing as one moves from one magnetic pole to a following pole.

This makes it possible, especially, to concentrate the magnetic energy towards the air gap of the machine.

In one embodiment of the invention, the magnetised structure of the stator comprises a plurality of permanent magnets, at least one of these magnets, in a central region following a circumference of the stator, having a magnetisation direction other than radial and orthoradial directions.

For example, the magnetised structure of the stator may comprise a plurality of permanent magnets, at least one of the permanent magnets having at every point a magnetisation direction other than radial and orthoradial directions.

If desired, this permanent magnet can have a direction of magnetisation which is essentially parallel to itself at every point of the magnet.

In one embodiment of the invention, the magnetised structure of the stator comprises at least two permanent magnets defining two consecutive magnetic poles of the magnetised structure and this structure also includes two permanent magnets interposed between said two magnets defining the poles.

The magnetised structure may, where appropriate, have a thickness, measured along a radial direction of the magnetised structure, which is essentially constant when one moves circumferentially from one magnetic pole of the structure to a following pole.

As a variant, the magnetised structure may have a thickness which varies when one moves circumferentially from one magnetic pole of the structure to a following pole.

The magnetised structure may, for example, include permanent magnets of different thicknesses.

In one embodiment of the invention, the magnetised structure is devoid of any interrupted zone having an electrical angle width of greater than 1°, especially 2° or 5°. The interrupted zone corresponds, for example, to the presence of a tab of a support of the magnetised structure inserted in a radial slit of this structure. This tab defines an air gap between two permanent magnets of the magnetised structure.

In one embodiment of the invention, the orientation of the direction of magnetisation within the magnetised structure varies, between two consecutive magnetic poles, in a way which is essentially discontinuous or, as a variant, continuously.

The machine according to the invention may be of the two or four poles type, or preferably six poles or more.

The magnetised structure may comprise a number of permanent magnets strictly greater than the number of poles of the machine, especially greater than or equal to twice the number of poles.

For example, the machine may be of the six poles type and the magnetised structure may comprise 24 permanent magnets.

As a variant, the magnetised structure comprises a number of permanent magnets less than or equal to the number of poles of the machine, especially being equal to half of the number of poles.

For example, the machine may be of the six poles type and the magnetised structure may comprise three permanent magnets, each extending over an angle of about 120°.

If necessary, the magnetised structure comprises at least one permanent magnet made from a base of NdFeB, especially sintered. As a variant, the magnetised structure comprises at least one magnet made from ferrite.

The object of the invention is also a direct current rotating electrical machine, especially for a motor vehicle starter, the machine comprising:

a stator comprising a magnetised structure with permanent magnetisation, extending along a circumference of the stator,
a rotor,
a group of brushes arranged to allow the electrical supply of the rotor by switching the electrical current in sections of the rotor, the machine being characterised by the fact that the magnetised structure of the stator comprises at least one sector, between two consecutive magnetic poles of this structure, having a magnetisation vector which varies essentially sinusoidally as one moves along the circumference of the stator.

The sinusoidal form of the magnetisation can produce less sensitivity to the armature reaction, and if necessary increase the torque developed by the machine.

Advantageously, the angular displacement of the neutral line is selected so as to improve switching when the machine is operating, by active acceleration of the current in the rotor in the course of inversion.

The realisation of the angular displacement, which is optionally relatively strong, may be better controlled, especially in relation to magnetisation in a radial direction, because this angular displacement is effected along an essentially linear or locally linear path of the induction.

In one embodiment of the invention, the angular displacement of the neutral line may in particular be greater than 15° electric, or even 20° electric.

The direction of the magnetisation vector within the magnetised structure may, if desired, vary essentially sinusoidally over the entire circumference of this structure.

As a variant, the magnetised structure includes at least one sector having a magnetisation vector which varies in a non-sinusoidal manner, for example with a radial direction in the sector, this sector extending especially over an electrical angle greater than 10°, especially 20°.

If necessary, the machine may act as a motor vehicle starter, exhibiting a strong armature reaction.

The electric machine may comprise a speed reducer.

The invention makes it possible, due to an increase in torque, to reduce the speed of rotation of the collector of the machine, for the same operating point of the torque, which ensures a longer time for switching and consequently a reduction in losses and in wear due to electrical arcs (sparks) of the brushes and of the collector.

Additionally, with the aid of the invention, because of the reduction in the amplitude of the electrical arcs, by improving switching, it is possible to limit conducted and radiated electromagnetic interference, which is especially advantageous in terms of electromagnetic compatibility (EMC) of electrical and electronic equipment (aboard a vehicle or not) with the electric machine.

If desired, the support can carry a plurality of main magnets with a radial direction of magnetisation and a plurality of auxiliary magnets each arranged between two consecutive main magnets, and with an orthoradial direction of magnetisation. The auxiliary magnets may for example have a thickness measured along a radial direction of the stator which is less than that of the main magnets. These auxiliary magnets are, for example, separated from the yoke by a space corresponding essentially to the difference in thickness between main magnets and auxiliary magnets.

The object of the invention is also a direct current rotating electrical machine, especially for a motor vehicle starter, the machine comprising:

a stator comprising a magnetised structure, especially with permanent magnetisation, extending along a circumference of the stator,
a rotor,
a group of brushes arranged to allow the electrical supply of the rotor by switching the electrical current in sections of the rotor, the machine being characterised by the fact that the magnetised structure of the stator comprises at least one sector, between two consecutive magnetic poles of this structure, with a varying magnetisation vector direction, especially in a way which is essentially sinusoidal, when one moves along the circumference of the stator.

The angular displacement of the neutral line may be selected so as to improve switching when the machine is operating.

In the sector in question of the magnetised structure, the intensity of magnetisation may be essentially constant or may be variable, even if its direction varies.

The magnetised structure comprises, if desired, at least two magnets, especially two permanent magnets, and at least one of the magnetic poles of the magnetised structure may be placed essentially on a circumferential end of one of the magnets, the direction of magnetisation within the magnet on this circumferential end being especially essentially radial.

In one embodiment of the invention, the magnetised structure contains a plurality of magnets, and each of the magnetic poles of the magnetised structure is placed in the area of a junction between two consecutive magnets.

Advantageously, the direction of the magnetisation vector within at least one of the magnets of the magnetised structure varies, especially in an essentially sinusoidal manner, when one moves circumferentially from a first circumferential end towards a second circumferential end of the magnet, the respective magnetisation vectors on the circumferential ends being of the same radial direction but in opposite directions.

For preference the machine includes a number Nb of poles and the magnetised structure comprises an identical number Nb of magnets, especially arranged adjacently.

For example, a machine with six magnetic poles may comprise a magnetised structure with six permanent magnets.

In one embodiment of the invention, the normal component of the induction generated by the stator in the air gap of the machine has at least one turning point close to one of the magnetic poles, this turning point corresponding especially essentially to a junction between two consecutive magnets of the magnetised structure.

If desired, the normal component of the induction generated by the stator in the air gap has an essentially sinusoidal form along a circumference of the stator.

As a variant, the normal component of the induction generated by the stator in the air gap has an essentially trapezoid form along a circumference of the stator.

The invention also relates to a direct current rotating electrical machine, especially a motor vehicle starter, the machine comprising:
  a stator comprising a magnetised structure, especially with permanent magnetisation, extending along a circumference of the stator,
  a rotor,
  a group of brushes arranged to allow the electrical supply of the rotor by switching the electrical current in sections of the rotor,
the machine being characterised by the fact that the magnetised structure comprises a plurality of main magnets and a plurality of auxiliary magnets each arranged between two main magnets, the auxiliary magnets having in particular an angular extent and/or a radial thickness which is/are less than that/those of the main magnets, and by the fact that the magnetisation vector in one of the main and auxiliary magnets varies, for example continuously or in steps, at least locally taking a direction other than radial and orthoradial directions.

In particular, the magnetisation vector rotates, in relation to the radial direction, continuously or in steps, when one moves along a circumference of this magnet in such a way that the magnetisation vector takes different angles in relation to the radial direction along this circumference.

The main magnets and the auxiliary magnets advantageously provide magnetic contributions to the machine which are added together so as to reinforce the electromagnetic stator-rotor coupling, and consequently the torque and the electromotive force.

In one embodiment of the invention, the magnetisation vector within at least one of the main magnets varies, at least locally, by taking a direction other than radial and orthoradial directions, and the magnetisation vector within at least one of the auxiliary magnets is essentially uniform, especially orthoradial in direction.

For example, the direction of magnetisation in this main magnet varies essentially sinusoidally from one edge to the other.

As a variant, the magnetisation vector within at least one of the auxiliary magnets varies, at least locally by taking a direction other than radial and orthoradial directions, and the magnetisation vector within at least one of the main magnets is essentially uniform, especially radial in direction.

As a further variant, the magnetisation vector within at least one of the main magnets and at least one of the auxiliary magnets varies at least locally, by taking a direction other than radial and orthoradial directions.

If desired, the direction of magnetisation exhibits a jump when one moves from one of the main magnets to the adjacent auxiliary magnet.

As a variant, the direction of magnetisation has a direction which remains essentially constant when one moves from one of the main magnets to the adjacent auxiliary magnet.

In one embodiment of the invention, the stator includes at least one clip arranged so as to retain at least one of the auxiliary magnets between two main magnets.

Advantageously, the main magnets are made from a material different from that of the auxiliary magnets.

The electric machine according to the invention may be arranged to operate at a maximum power of between 500 W and 2000 W, for example.

BRIEF DESCRIPTION OF THE DRAWINGS

The invention will be better understood on reading the detailed description which follows, of non-limitative embodiments of the invention, and on an inspection of the attached drawing, in which.

DETAILED DESCRIPTION

Figure 1:
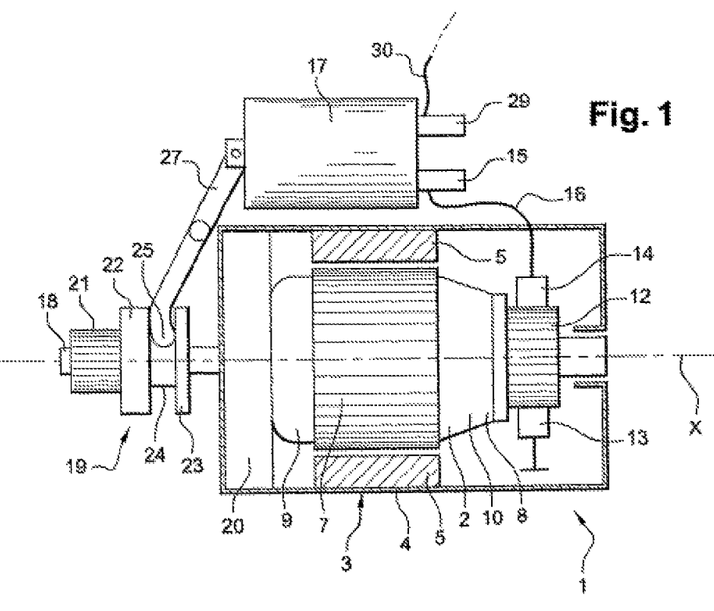
FIG. 1 shows, in diagram form and partially, a motor vehicle starter according to one embodiment of the invention.

A starter 1 for a combustion engine of a motor vehicle has been shown very diagrammatically in FIG. 1.

This direct current starter 1 contains, firstly, a rotor 2, also known as an armature, capable of rotating about an axis X, and secondly, a stator 3, also known as an inductor, around the rotor 2.

This stator 3 comprises a yoke 4 carrying a magnetised structure 5 with permanent magnetisation.

The rotor 2 contains a rotor body 7 and a winding 8 wound in the notches of the rotor body 7.

In the example illustrated, the rotating electrical machine formed by the starter 1 is of the six poles type.

The winding 8 forms, on either side of the rotor body 7, a front coil end 9 and a rear coil end 10.

The rotor 2 is provided, at the back, with a collector 12 comprising a plurality of contact pieces connected electrically to the conductor elements, formed in the example in question by wires, of the winding 8.

A group of brushes 13 and 14 is provided for the electrical supply of the winding 8, one of the brushes 13 being connected to the earth of the starter 1 and another of the brushes 14 being connected to an electrical terminal 15 of a contact 17 via a wire 16. The brushes are, for example, four in number.

The brushes 13 and 14 rub against the collector 12 when the rotor 2 is in rotation, allowing the electrical supply of the rotor 2 by switching the electrical current in sections of the rotor 2.

The starter 1 also includes a drive assembly 19 mounted so as to slide on a drive shaft 18 and able to be driven in rotation about the X axis by the rotor 2.

A speed reducer assembly 20 is interposed between the rotor 2 and the drive shaft 18, in the way known in the art.

As a variant, the starter 1 may be of the 'Direct Drive' type, without speed reducers.

The drive assembly 19 includes a drive element formed by a pulley 21 and intended to engage on a drive member of the combustion engine, not shown. This drive member is, for example, a belt.

The pulley 21 may be replaced by a gear element, especially a toothed wheel, in order to drive the combustion engine.

The drive assembly 19 also comprises a free wheel 22 and a pulley washer 23 defining between them a groove 24 to receive the end 25 of a fork 27.

This fork 27 is realised, for example, by moulding of a plastic material.

The fork 27 is actuated by the contact 17 to move the drive assembly 19 in relation to the drive shaft 18, along the X axis, between a first position in which the drive assembly 19 drives the combustion engine by means of the pulley 21, and a second position in which the drive assembly 19 is disengaged from the combustion engine.

The contact 17 comprises, in addition to the terminal 15 connected to the brush 14, a terminal 29 connected via an electric connection element, especially a wire 30, to an electrical power supply of the vehicle, especially a battery.

Figure 2:
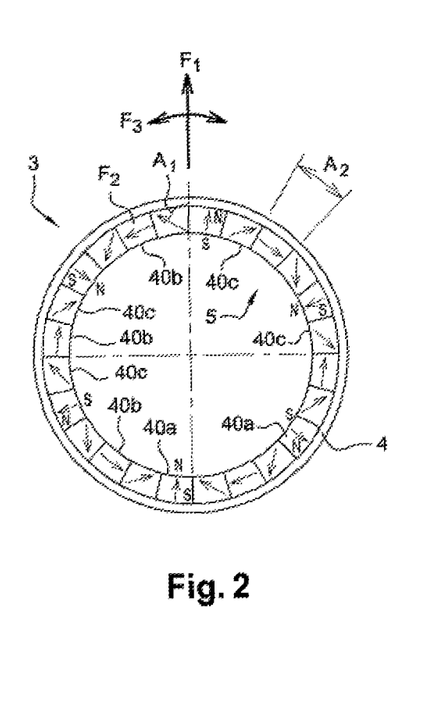
FIGS. 2 and 3 show, in diagram form and partially, two magnetised structures according to two embodiments of the invention.

FIG. 2 shows an example of a magnetised structure 5 conforming to a first embodiment of the invention.

In this example, the magnetised structure 5 contains a number of permanent magnets, numbering 24, strictly greater than the number of poles of the machine, which is six. Six of the 24 magnets have a magnetisation in a radial direction, parallel to the arrow F1 illustrated in FIG. 1.

These magnets 40a define the six poles of the machine, of which three poles are North N and three poles are South S facing the interior of the stator.

Between two consecutive magnets 40a are arranged three permanent magnets:

one magnet 40b having a direction of magnetisation which is essentially orthoradial F2, perpendicular to the direction F1, and on either side of this magnet 40b, two magnets 40c having a direction of magnetisation other than radial and orthoradial directions.

In the example in question, the direction of magnetisation is essentially uniform within each magnet 40c and forms, with the radial direction F1, an angle A1 of about 45°.

The magnets 40c thus each define a sector of the magnetised structure 5 having a direction of magnetisation other than radial and orthoradial directions and having an angular width A2 of 15°, which corresponds to an electrical angle of 45°.

As may be noted, at every point, especially in a central region according to the circumference F3 of the stator 3, the magnets 40c have a direction of magnetisation other than radial F1 and orthoradial F2 directions.

The permanent magnets 40a-40c may, as illustrated in FIG. 2, have identical dimensions, with the result that the magnetised structure 5 has a thickness, measured according to the radial direction F1, which is essentially constant when one moves along the circumference F3.

Between two magnetic poles N and S, the direction of magnetisation of the magnetised structure 5 exhibits four angular jumps, each of 45°.

The magnetisation then has a number of angular transitions, between two poles N and S, equal to three.

Between two consecutive N and S magnetic poles of the magnetised structure 5, the angle between the direction of magnetisation of the structure and the radial direction F1 varies monotonically and discontinuously, without any angular turning points.

This may allow the magnetic energy to be concentrated towards the air gap, between the rotor 2 and the stator 3, corresponding to a significant reduction of the induction at the outside of the magnetised structure 5 and a significant augmentation of the induction on the inside.

In other words, the magnetic field generated by the magnetised structure at the outside thereof, and measured in the absence of the yoke 4, is weaker than the field generated on the inside of the magnetised structure 5, the magnetic energy on the outside of the magnetised structure being especially less than 30% or 20% of the magnetic energy inside the structure, the magnetic energy on the outside of the structure, measured in the absence of the yoke, being especially negligible.

It has been noted that a sufficient number of angular transitions, for example three, guarantees good mechanical stability of the magnets 40a-40c.

Figure 4A:
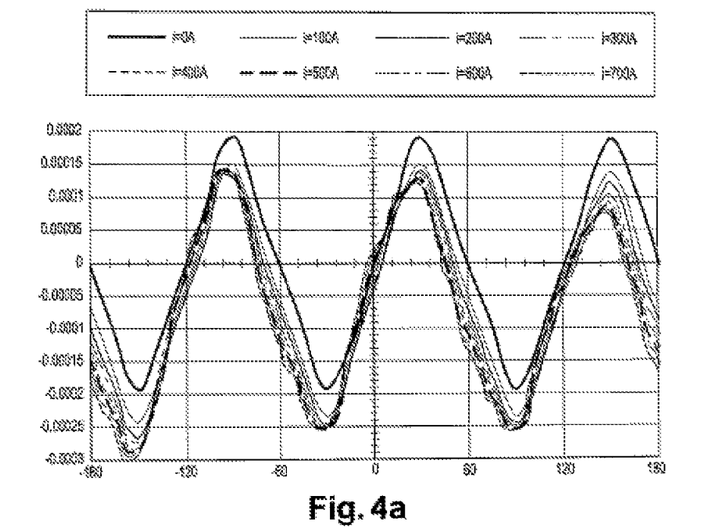
FIGS. 4a and 4b are two graphs showing the variation of the vector potential as a function of the angle in the air gap, respectively according to the invention and to the state of the art.

FIG. 4a shows the variations of the vector potential (units: Wb/m) as a function of the angle in the air gap, for several values of the current I and a number of angular transitions equal to two. These variations have been obtained by finite element analysis.

It may be pointed out that the graph in FIG. 4a is in the form of a classic representation in two dimensions so as to clearly show any shifting of the magnetic neutral line.

In FIG. 4a, it will be noted that there is a near-absence of displacement of the magnetic neutral line, which corresponds to the point at which the induction between two consecutive poles is cancelled out, when the current I varies.

In other words, by having a number of angular transitions greater than or equal to two between the consecutive magnetic poles, it is possible essentially to cancel out the armature reaction, which is advantageous with respect to switching and electromagnetic coupling.

Figure 4B:
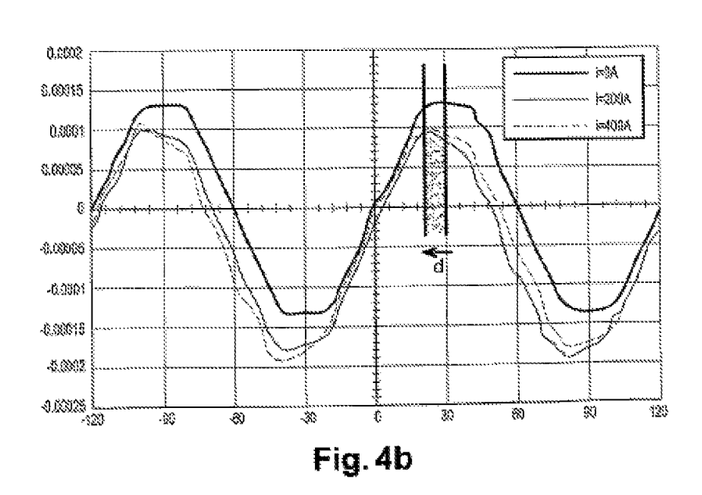

On the other hand, in a case illustrated in FIG. 4b, where the magnetised structure has no angular transition, a displacement d of the magnetic neutral line appears.

It has been found that the invention enables the torque and the specific outputs to be increased.

In the example in question, the permanent magnets 40a-40c are magnets made of anisotropic sintered ferrite.

The magnetisation of the magnets 40a-40c is realised, for example, outside of the yoke 4.

As a variant, the permanent magnets 40a-40c may contain rare earth elements, for example being made from NdFeB.

In the example just described, the magnetised structure 5 contains a number of permanent magnets 40a-40c greater than the number of N and S poles of the machine.

Figure 3:
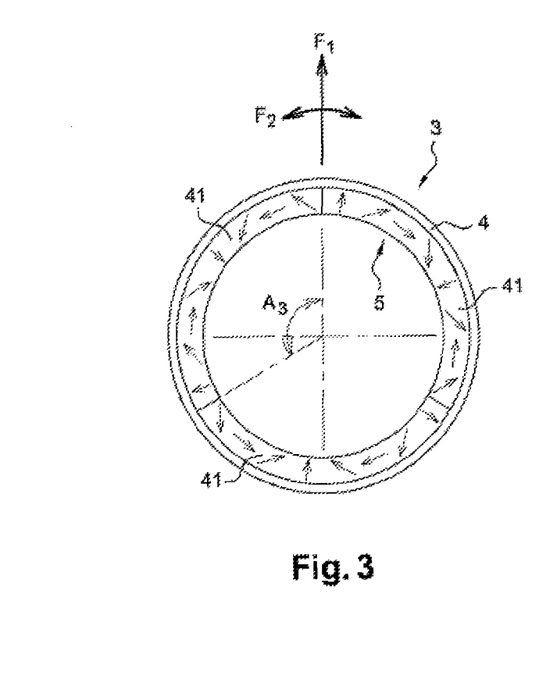

As a variant, as illustrated in FIG. 3, the structure 5 may contain a number of permanent magnets less than the number of poles of the machine.

According to the embodiment illustrated in FIG. 3, the structure 5 contains three permanent magnets 41, each essentially taking the form of a cylinder portion generated by rotation of an angle A3 equal to 120°.

These magnets 41 are, for example, made from NdFeB, with isotropic properties and having a magnetisation of direction which varies sinusoidally when one moves along the circumference F2 of the stator 3, along a magnet 41.

If desired, it is possible to magnetise the magnets 41 inside the yoke 4.

In the example in FIG. 3, the number of angular transitions between two consecutive poles of the machine remains equal to three.

Obviously, it would not be going beyond the scope of the present invention if the number of angular transitions is other than three.

Figure 5:
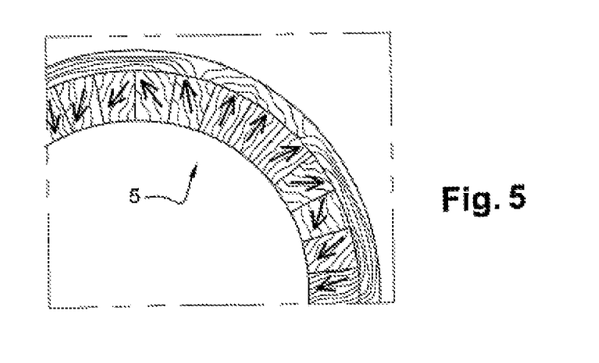
FIG. 5 illustrates, in diagram form and partially, another example of a magnetised structure according to the invention.

This number may, depending on the type of machine, be equal to two or greater than or equal to four. For example, FIG. 5 shows a magnetised structure 5 with six angular transitions between two consecutive magnetic poles.

The number of poles may be other than six, especially being greater than six. The machine may contain, for example, 8 poles.

As a variant, the machine may contain a number of poles less than six, for example 2 or 4 poles.

Figure 6:
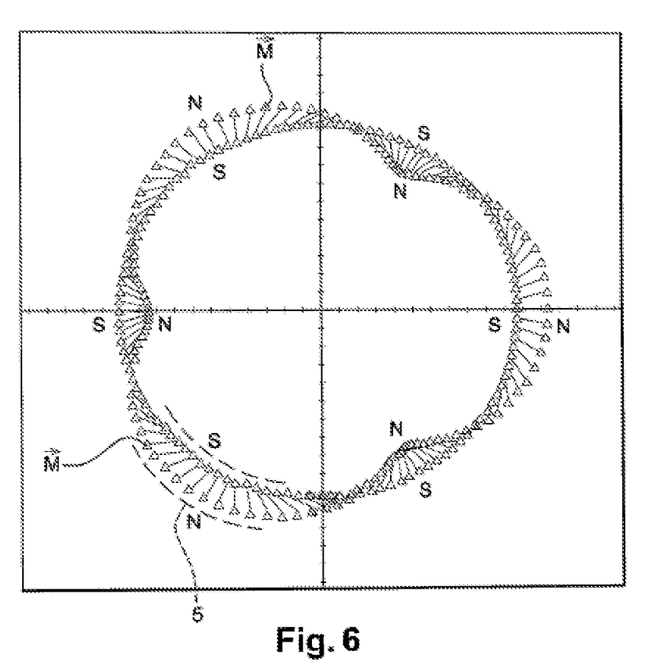
FIG. 6 illustrates sinusoidal magnetisation within a magnetised structure according to another embodiment of the invention.

FIG. 6 shows a magnetised structure 5 according to another embodiment of the invention, having a magnetisation vector $\overline{M}$ within the magnetised structure 5, the direction of which varies essentially sinusoidally over the entire circumference of this structure 5.

As a variant, the direction of magnetisation may have a sinusoidal profile only on certain sectors of the structure 5, and not over its entire circumference.

The magnetisation vector $\overline{M}$ in this magnetised structure 5 may have a module $\|\overline{M}\|$ which is essentially constant along the circumference of the structure.

In the example in question, the magnetised structure 5 contains six magnetic N and S poles.

Figure 8:
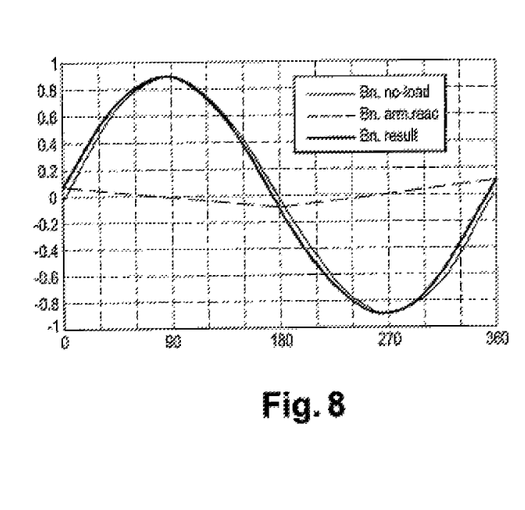
FIG. 8 shows in diagram form the variation of the induction as a function of the angle, generated by the magnetised magnetisation structure illustrated in FIG. 6, FIGS. 9 and 10 illustrate two types of angular displacement of the neutral line, for the magnetised magnetisation structure illustrated in FIG. 6.
Figure 9:
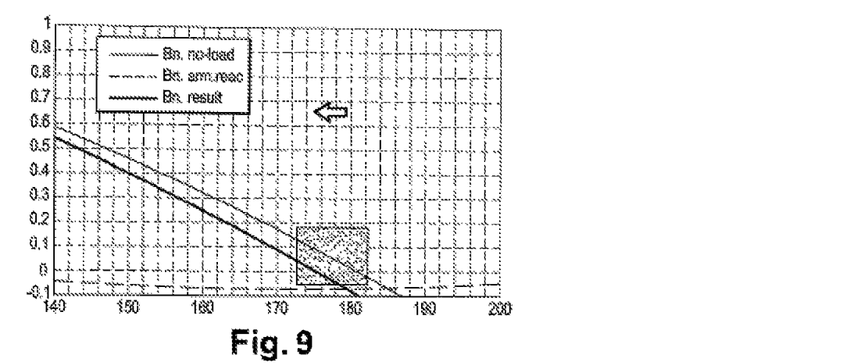

FIG. 8 illustrates the variation, as a function of the angle, of the normal component of the fields Bn.no-load (no-load induction), Bn.arm.reac (induction relating to the armature reaction) and Bn.result (induction resulting from Bn.no-load and Bn.arm.reac), for the magnetised structure 5 illustrated in FIG. 6. The induction Bn.result is essentially sinusoidal, and the angular displacement of the neutral line (where the induction is cancelled out) is about 5°, as can be seen better in FIG. 9.

Figure 7:
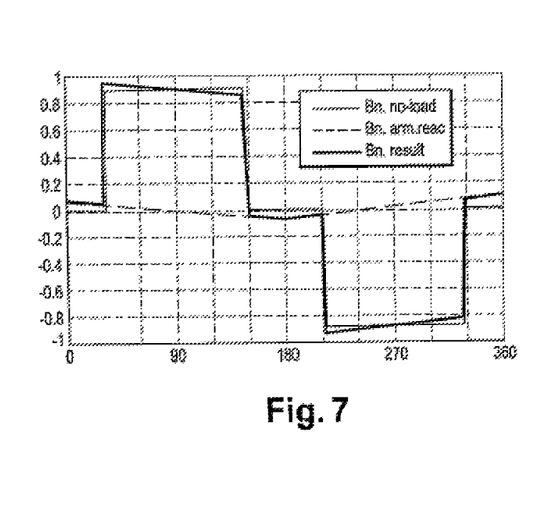
FIG. 7 shows in diagram form the variation of the induction as a function of the angle, generated by a known magnetised structure.

By way of comparison, FIG. 7 illustrates these same fields for a magnetised structure with an exclusively radial magnetisation. The normal component of the induction Bn.result essentially has a trapezoid profile, and the angular displacement of the neutral line is about 30°, i.e. much greater than in the invention.

Contrary to the case of exclusively radial magnetisation where, under load, an electromotive force is produced leading to a degradation of the switching conditions (delaying effect on the inversion of the current in the rotor, and thus an increase in losses due to electric arcs), it is possible, with the aid of the invention, to compensate satisfactorily for the slight degradation of these switching conditions by a low angular displacement.

The invention may make it possible to introduce a supplementary angular displacement such that the inversion of the current is accelerated, without the usual disadvantages of radial magnetisation.

With the aid of the invention, a more localised level of induction is exploited in order to generate an electromotive force which accelerates the inversion of the current, along a linear path associated with the local profile of a sine, which makes it possible to facilitate a robust definition of the electric machine, without the disadvantage of a major loss of torque, since a smaller angular displacement is sufficient to allow switching which is centred about the region of zero induction.

Moreover, it is possible to impose a large angular displacement in order to improve switching still further, since the magnetised structure 5 according to the invention makes it possible to arrange a 'reservoir of torque' which can be used depending on the needs of the machine, the invention enabling an increase in the torque with the same quality and quantity of magnets.

Figure 10:
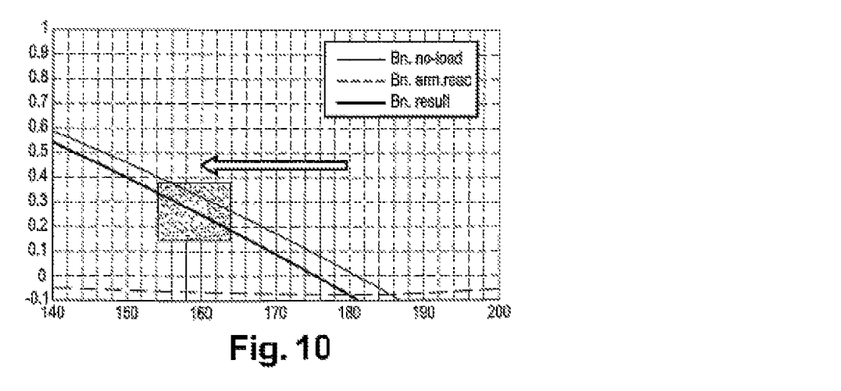

This angular displacement may be selected to be greater than 10° electric, or 20° electric, as in the example described (see FIG. 10).

The invention further allows a reduction in the core losses in the armature due to the fact that in sinusoidal induction, the disadvantages relating to harmonics are attenuated.

Magnetic noise may also be reduced.

Obviously, the invention is not limited to the embodiments which have just been described.

Figure 11:
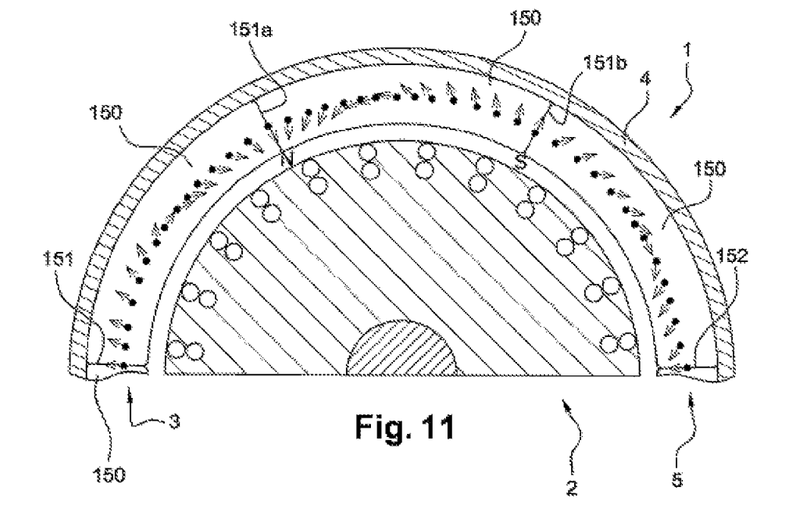
FIG. 11 shows, in diagram form and partially, a magnetised structure according to another embodiment of the invention.

For example, as illustrated in FIG. 11, the starter 1 may comprise a magnetised structure 5 comprising six permanent magnets 150, and at least one of the magnetic N and S poles of the magnetised structure 5 is placed essentially on one circumferential end 151 of one of the magnets 150, the direction of magnetisation within the magnet 150 at this circumferential end being essentially radial.

In the embodiment of the invention described, all the magnetic N and S poles of the magnetised structure 5 are each placed in a junction zone 152 between two consecutive magnets 150.

As illustrated in FIG. 11, the direction of the magnetisation vector within the magnets 150 of the magnetised structure 5 varies essentially sinusoidally, when one moves circumferentially from a first circumferential end 151a to a second circumferential end 151b of the magnet 150.

The magnetisation vectors at the two circumferential ends 151 of the same magnet 150 are radial in direction but in opposite directions.

The magnetised structure 5 comprises as many magnets 150 as it does N and S poles.

These magnets 150 are, for example, arranged side by side, in contact two by two, or very close.

Figure 12:
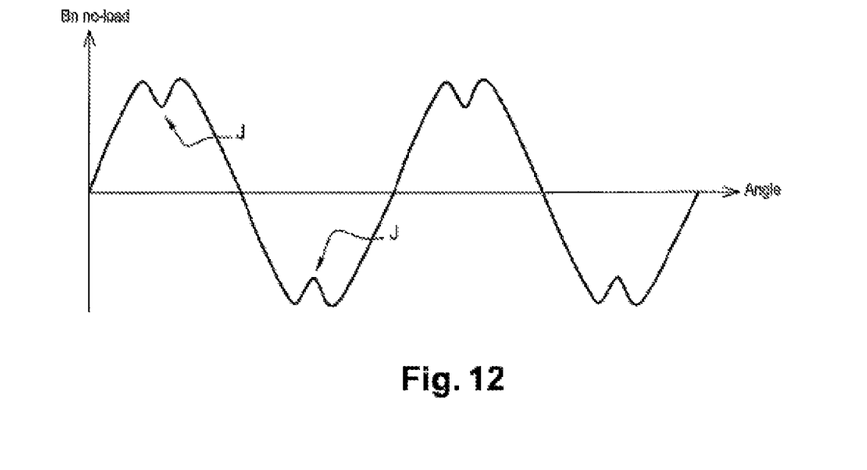
FIG. 12 is a graph showing the variation of the induction generated by the magnetised structure of FIG. 11 in the air gap as a function of the circumferential angle.

As illustrated in FIG. 12, the normal component Bn.no-load of the induction generated by the stator 3 in the air gap has a turning point J in proximity to one of the magnetic poles N and S, this turning point J corresponding essentially to a junction between two adjacent magnets 150 of the magnetised structure 5.

This normal component Bn.no-load of the induction generated by the stator has an essentially sinusoidal form as a function of the angle.

Figure 13:
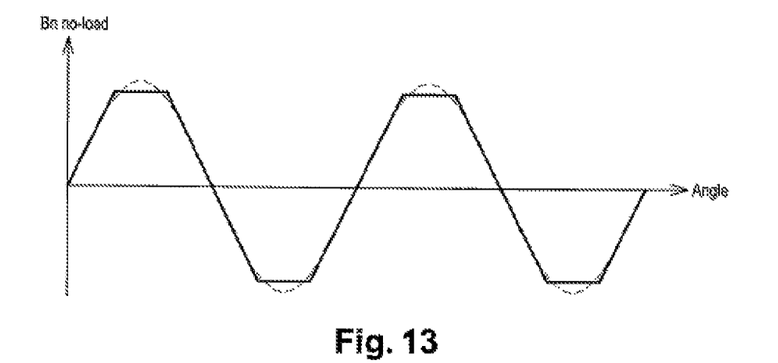
FIG. 13 is a graph showing the variation of the induction generated by a magnetised structure in the air gap as a function of the circumferential angle, according to another embodiment of the invention.

As a variant, the magnetised structure 5 may be arranged so that the normal component Bn.no-load of the induction generated by the stator in the air gap has an essentially trapezoid form as a function of the angle, as illustrated in FIG. 13.

Figure 14:
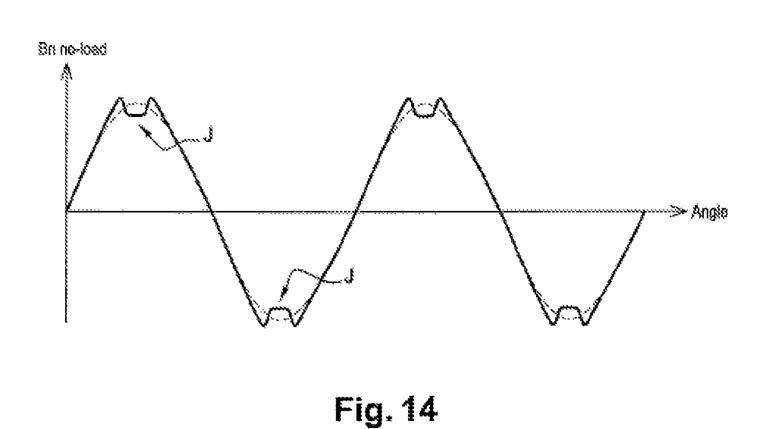
FIG. 14 is a graph showing the variation of the induction generated by a magnetised structure in the air gap as a function of the circumferential angle, according to yet another embodiment of the invention.

In the manner of the induction illustrated in FIG. 12, the trapezoid profile of Bn.no-load may have some turning points J (see FIG. 14).

The linearity of the Bn.no-load curve halfway between successive N and S poles, i.e. in the interpolar zone, can be seen in FIGS. 13 and 14, the trapezoid profile being an approximation of a sinusoidal profile at this location.

Other embodiments of the invention will now be described.

Before doing so, FIGS. 15 and 16 again show an arrangement according to a state of the art with a magnetised structure 160 comprising a plurality of main magnets 161 and a plurality of auxiliary magnets 162 each arranged between two main magnets 161.

Figure 15:
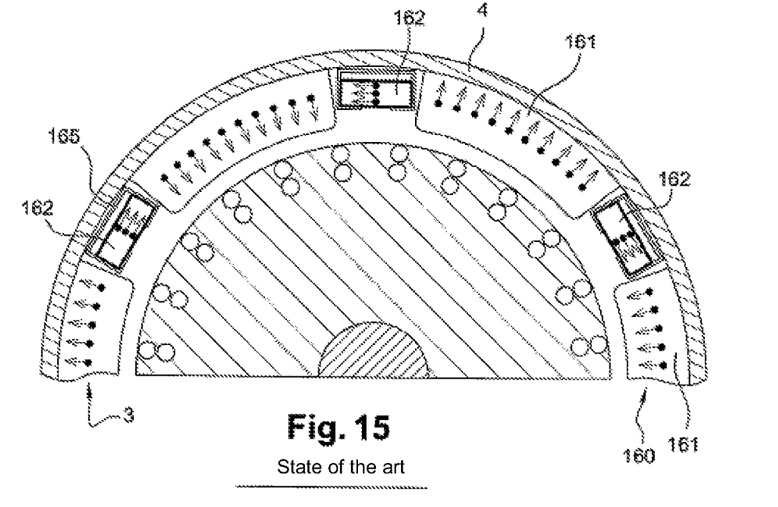
FIG. 15 shows, in diagram form and partially, a magnetised structure according to the state of the art.
Figure 16:
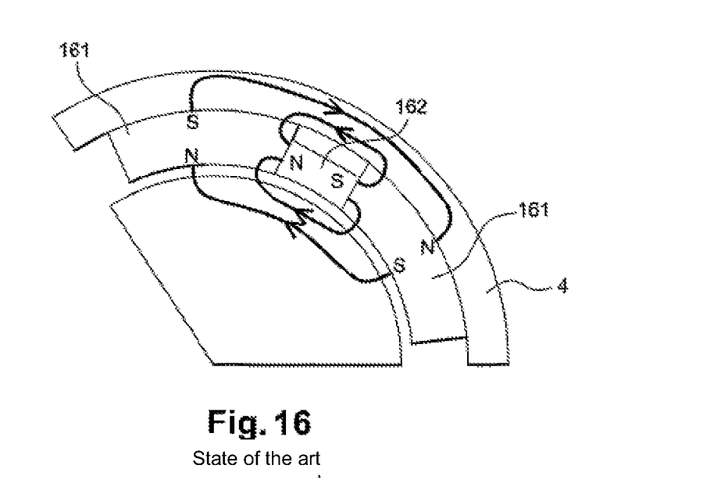
FIG. 16 shows in diagram form and partially, the flux lines of the structure from FIG. 15, and FIGS. 17 to 20 illustrate, in diagram form and partially, different magnetised structures according to other embodiments of the invention.

The auxiliary magnets 162 have an angular extent and a radial thickness which are less than those of the main magnets 161.

The stator 3 contains clips 165 arranged to retain the auxiliary magnets 162 between two main magnets 161.

In the example described, the main magnets 161 are made of a different material from that of the auxiliary magnets 162.

As a variant, the main and auxiliary magnets may be made from the same material.

The materials for the magnets are, for example, ferrite or NdFeB.

The "magnetic equiflux" lines of the magnetised structure 160 are shown in diagram form in FIG. 16.

As can be seen, the action of the auxiliary magnets 161 tends to desaturate the yoke 4.

Figure 17:
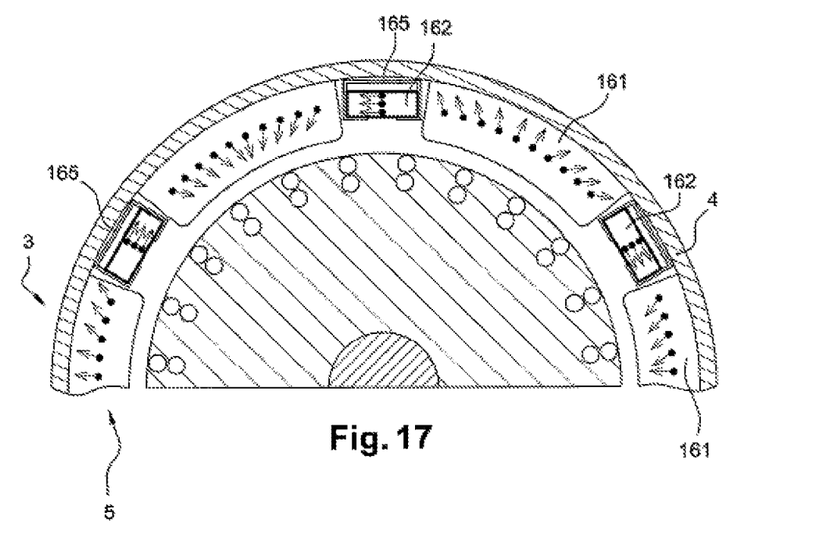

In one embodiment of the invention, illustrated in FIG. 17, the direction of the magnetisation vector within the main magnets 161 varies essentially sinusoidally, locally taking a direction other than radial and orthoradial directions, and the magnetisation vector within the auxiliary magnets 162 is essentially uniform, and orthoradial in direction.

The direction of magnetisation exhibits a jump when one passes from one of the main magnets 161 to the adjacent auxiliary magnet 162.

Figure 18:
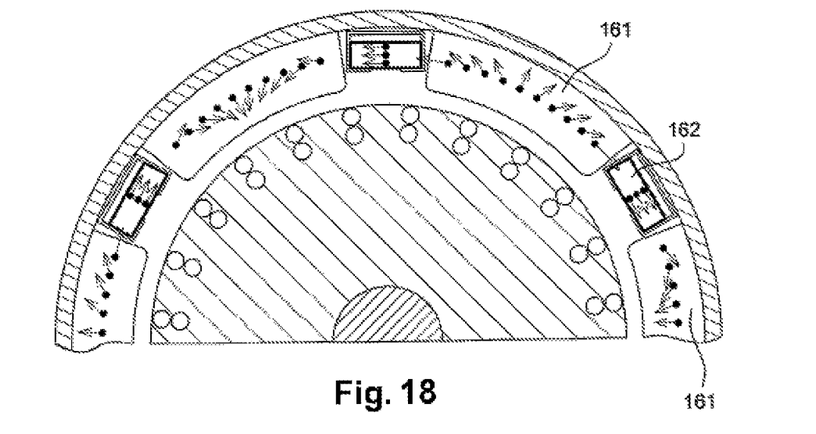

As a variant, the direction of magnetisation has a direction which is essentially constant when one passes from a main magnet 161 to the adjacent auxiliary magnet 162, as illustrated in FIG. 18.

Figure 19:
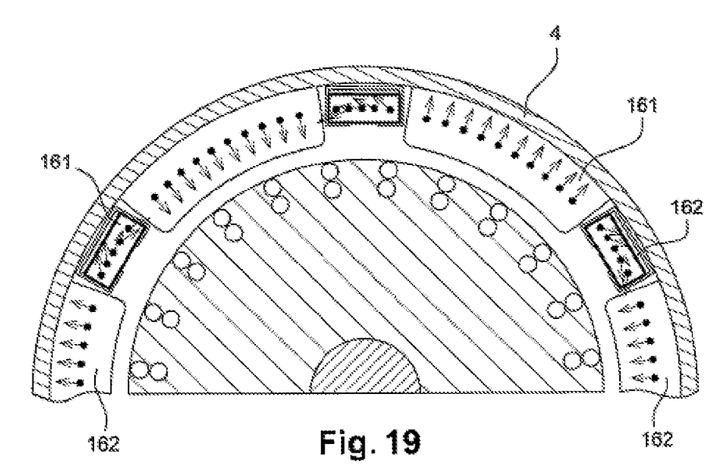

In the embodiment of the invention illustrated in FIG. 19, the direction of the magnetisation vector within the auxiliary magnets 162 varies essentially sinusoidally, taking a direction other than radial and orthoradial directions, and the magnetisation vector within the main magnets 161 is essentially uniform, and radial in direction.

Figure 20:
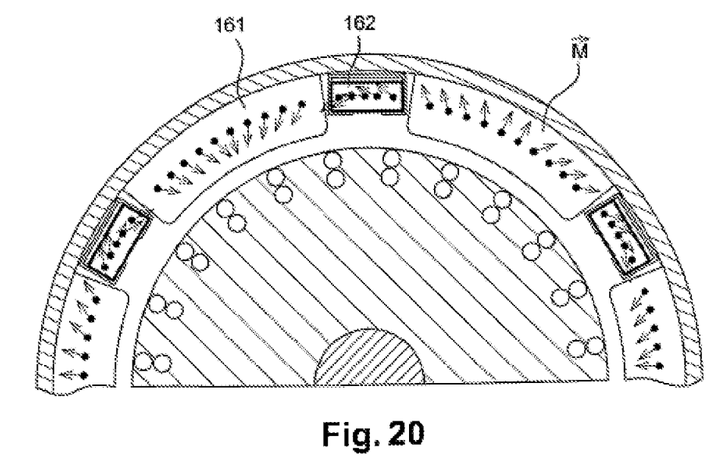

As a further variant, as can be seen in FIG. 20, the direction of the magnetisation vector within both the main magnets 161 and the auxiliary magnets 162 varies essentially sinusoidally, taking a direction other than radial and orthoradial directions.

The invention claimed is:

1. A direct current rotating electrical machine, the machine comprising:
   a stator (3) comprising a magnetized structure with permanent magnetization extending along a circumference of the stator;
   a rotor (2); and
   a group of brushes (13, 14) arranged to allow the electrical supply of the rotor by switching the electrical current in sections of the rotor,
   the magnetized structure (5) of the stator including at least one sector between two consecutive magnetic poles (N; S) of the magnetized structure, the at least one sector having a magnetization direction varying essentially sinusoidally along the circumference of the stator (3);
   an angular displacement of a neutral line selected so as to improve switching when the electrical machine is in operation;
   the magnetized structure (5) including at least two magnets (150);
   at least one of the magnetic poles (N; S) of the magnetized structure (5) positioned at a circumferential end (151) of one of the magnets;
   the magnetization direction within the one of the magnets on the circumferential end thereof being substantially radial;
   the electrical machine comprising a number Nb of the poles;
   the magnetized structure (5) including a number Nb of the magnets, arranged adjacent to each other.

2. The machine according to claim 1, wherein the magnetized structure (5) comprises a plurality of magnets (150); and wherein each of the magnetic poles (N; S) of the magnetized structure is positioned in a junction zone (152) between two adjacent magnets.

3. The machine according to claim 1, wherein the magnetization direction within one of the magnets of the magnetized structure varies substantially sinusoidally, when one moves from a first circumferential end (151a) to a second circumferential end (151b) thereof, the magnetization directions on the respective circumferential ends of one of the magnets are radial in direction and in opposite directions.

4. The machine according to claim 1, wherein the normal component of the induction (Bn.no-load) generated by the stator in an air gap between the rotor and the stator has a form which is essentially sinusoidal along a circumference of the stator.

5. A direct current rotating electrical machine, the machine comprising:

a stator (3) comprising a magnetized structure with permanent magnetization extending along a circumference of the stator;

a rotor (2); and a group of brushes (13, 14) arranged to allow the electrical supply of the rotor by switching the electrical current in sections of the rotor, the magnetized structure (5) of the stator including at least one sector between two consecutive magnetic poles (N; S) of the magnetized structure, the at least one sector having a magnetization direction varying essentially sinusoidally along the circumference of the stator (3);

an angular displacement of a neutral line selected so as to improve switching when the electrical machine is in operation;

the magnetized structure (5) including at least two magnets (150);

at least one of the magnetic poles (N; S) of the magnetized structure (5) positioned at a circumferential end (151) of one of the magnets;

the magnetization direction within the one of the magnets on the circumferential end thereof being substantially radial;

a normal component of an induction (Bn.no-load) generated by the stator in an air gap between the rotor and the stator having at least one turning point (J) in proximity to one of the magnetic poles (N; S), the at least one turning point (J) corresponding substantially to a junction between the at least two adjacent magnets of the magnetized structure (5).

6. A direct current rotating electrical machine, the machine comprising:

a stator (3) comprising a magnetized structure with permanent magnetization extending along a circumference of the stator;

a rotor (2); and a group of brushes (13, 14) arranged to allow the electrical supply of the rotor by switching the electrical current in sections of the rotor, the magnetized structure (5) of the stator including at least one sector between two consecutive magnetic poles (N; S) of the magnetized structure, the at least one sector having a magnetization direction varying essentially sinusoidally along the circumference of the stator (3);

an angular displacement of a neutral line selected so as to improve switching when the electrical machine is in operation;

a normal component of an induction (Bn.no-load) generated by the stator in an air gap between the rotor and the stator has a form which being essentially trapezoid along a circumference of the stator.

* * * * *